(12) United States Patent
Fuchs (10) Patent No.: US 7,183,525 B2
(45) Date of Patent: Feb. 27, 2007

(54) ROASTING DEVICE

(75) Inventor: Christian Fuchs, Bülach (CH)

(73) Assignee: Inducs AG (CH)

( * ) Notice: Subject to any disclaimer, the term of this patent is extended or adjusted under 35 U.S.C. 154(b) by 86 days.

(21) Appl. No.: 10/522,762

(22) PCT Filed: Jun. 3, 2003

(86) PCT No.: PCT/CH03/00352

§ 371 (c)(1),
(2), (4) Date: Jan. 28, 2005

(87) PCT Pub. No.: WO2004/016139

PCT Pub. Date: Feb. 26, 2004

(65) Prior Publication Data

US 2005/0258168 A1  Nov. 24, 2005

(30) Foreign Application Priority Data

Aug. 16, 2002 (CH) .................... 1412/02

(51) Int. Cl.
*H05B 6/12* (2006.01)
*A47B 77/08* (2006.01)

(52) U.S. Cl. .................... 219/622; 312/236
(58) Field of Classification Search ........ 219/622, 219/625, 385, 647; 312/236
See application file for complete search history.

(56) References Cited

U.S. PATENT DOCUMENTS

| | | | | |
|---|---|---|---|---|
| 4,307,276 A * | 12/1981 | Kurata et al. | ................ | 219/650 |
| 4,348,571 A * | 9/1982 | Dills | ................ | 219/622 |
| 4,614,501 A * | 9/1986 | Koorneef et al. | ................ | 445/47 |
| 5,522,308 A | 6/1996 | Kayashima et al. | | |
| 6,214,401 B1 * | 4/2001 | Chaput et al. | ................ | 426/523 |
| 6,320,169 B1 * | 11/2001 | Clothier | ................ | 219/626 |
| 6,371,017 B1 * | 4/2002 | Yamazaki et al. | ................ | 101/129 |
| 6,608,291 B1 * | 8/2003 | Collins et al. | ................ | 219/662 |
| 2002/0008632 A1 | 1/2002 | Clothier | | |
| 2003/0095034 A1 | 5/2003 | Clothier | | |

FOREIGN PATENT DOCUMENTS

| DE | 195 40 408 A1 | 5/1997 |
|---|---|---|
| DE | 201 16 711 U1 | 12/2001 |
| EP | 0 645 114 A1 | 3/1995 |
| EP | 0 858 722 B1 | 8/1998 |
| WO | WO 97/16943 | 5/1997 |
| WO | WO 97/37515 | 10/1997 |

OTHER PUBLICATIONS

International Preliminary Examination Report for PCT/CH03/000352 (in English).

* cited by examiner

*Primary Examiner*—Daniel Robinson
(74) *Attorney, Agent, or Firm*—Hershkovitz & Associates; Abe Hershkovitz (57) ABSTRACT

The invention relates to a roasting/grilling device with a roasting/grilling plate (7) and with a thermostatic regulation of the roasting/grilling power. For this the temperature of the roasting/grilling plate (7) is monitored in a contactless manner by way of electromagnetic radiation. In combination with an efficient regulation and control unit, suitably arranged heating elements, preferably induction coils (30), as well as with a special roasting/grilling plate surface, an optimal roasting/grilling of food to be roasted/grilled becomes possible, in particular due to the fact that the temperature drops which are otherwise common with roasting/grilling device are prevented.

32 Claims, 3 Drawing Sheets

ROASTING DEVICE

CROSS-REFERENCE TO RELATED APPLICATIONS

The present application is a National Stage Application of International Application No. PCT/CH2003/000352, filed Jun. 3, 2003. Further, the present application claims priority under 35 U.S.C. 119 of Swiss Patent Application No. 1412/02 filed on Aug. 16, 2002.

The invention relates to a roasting/grilling device with a roasting/grilling plate incorporated in the roasting/grilling device, according to the preamble of the independent patent claim.

Devices which serve for roasting or grilling meals on a roasting/grilling plate are known from the state of the art. Such devices typically comprise a roasting/grilling plate of aluminium or steel which is heated from below by way of a tubular heating body or where appropriate in an inductive manner. The temperature of the roasting/grilling plate is usually regulated by a setting thermostat combined with an electrical supply lead, whose temperature probe is inserted at the edge of the roasting/grilling plate.

With these commercially available, temperature-regulated roasting/grilling devices however the constancy of the set temperature is considerably limited by several factors. On the one hand thermostats have a switch hysteresis of several ° C. On the other hand temperature fluctuations of the roasting/grilling plate, e.g. by way of placing the goods to be roasted/grilled, are communicated by heat transfer to the thermostat to some extent with considerable temporal delay. Furthermore a thermostat usually measures only at the edge, and accordingly may not take into account temperatures of various region of the roasting/grilling plate which to some extent may be very different. A logical consequence of this is the fact that known roasting/grilling devices are offered with only coarse temperature steps in ° C. or temperature ranges such as "weak", "medium", and "high" heat.

Last but not least, due to the fact that massive heat needs to be produced in roasting/grilling devices, a very high temperature drop on the roasting/grilling surface is characteristic of conventional devices. This of course is quite disadvantageous and has a negative effect on the quality of the roasted/grilled meals. Individual, still cold and to some extent even frozen foods are placed on a hot roasting/grilling plate. This leads to a spatial and temporal inhomogeneity of the temperature. A controlled roasting/grilling would therefore demand a regulation which ensures spatial and temporal constancy. A temperature which is as accurate and is held as constant as possible is of utmost importance for the quality of the roasted/grilled foods also when grilling and roasting/grilling food to be roasted/grilled. The fact that an exact control of the roasted/grilled goods is a requirement seems to be a problem which is not recognised.

It is therefore the object of the invention to provide a roasting/grilling device which avoids the disadvantages of conventional roasting/grilling devices. In particular, it is the object of the invention to provide a roasting/grilling device with which an optimal and controlled roasting/grilling of foods is possible.

The object is achieved by a roasting/grilling device as is defined in the patent claims.

The roasting/grilling device according to the invention contains a roasting/grilling plate incorporated in the roasting/grilling device and at least one measurement coil forming an element of a high-frequency oscillation circuit, wherein the temperature of the roasting/grilling plate may be monitored without contact by way electromagnetic radiation with the at least one measurement coil, and the temperature may be used for the thermostatic regulation of the roasting/grilling power.

The roasting/grilling device according to the invention has an accurate regulation which is essentially without sluggishness and preferably integrates over large regions of a roasting/grilling plate. The cable-less temperature measurement close to the food to be roasted/grilled is connected to a delay-free, electronic regulation of the roasting/grilling power, so that the food to be roasted/grilled is brought to the desired nominal temperature essentially in real-time and maintained as accurately as possible. An average temperature constancy of less than 1° C. may be achieved, whose actual value may furthermore be displayed in a digital manner. With this, amongst other things, undesired temperature drops and excessive temperatures on the roasting/grilling surface, and thus reductions of the quality of the food to be roasted/grilled which this entails are reduced. Furthermore with regard to the materials used in the roasting/grilling device, their design and processing are matched to one another in a manner such that a uniform heat distribution and an optimal use of energy are possible.

A cooking system is described in the European Patent No. 0 858 722 which by way of a contact-free thermostatic regulation with the use of electromagnetic radiation may measure the temperature of a base of a vessel. This system however relates to separate cooking utensils, e.g. pans, pots which are placed on cooking surfaces which are permeable to radiation. The determining of the temperature through the cooking surface may therefore not be realised in a direct manner, but only indirectly by way of a remote monitoring with electromagnetic radiation.

In contrast to this, with the roasting/grilling device according to the invention there are no separate cooking utensils and no separate cooking surfaces. Furthermore directly probing thermostatic regulation already exists for roasting/grilling plates, so that there appears to be no reason to provide a roasting/grilling plate which functions with an accuracy and constancy of temperature which has not been attained until now.

In contrast to the previously mentioned cooking system, the roasting/grilling device according to the invention has the further advantage that the measurement coil emitting the electromagnetic radiation and the roasting/grilling plate have a defined geometry to one another since they are installed in the device. On account of this one may exclude the occurrence of measurement errors which could occur with the cooking system of document No. 0 858 722 due to the fact that the cooking utensils are placed in an inaccurate manner, that its base arches on heating or that an unsuitable material is used for the utensils. Materials used for the roasting/grilling device according to the invention may furthermore be matched to one another already before the manufacture. This is particularly the case with the matching of regulation and control units of the measurement device and roasting/grilling power to material parameters and the geometry roasting/grilling device and its elements.

With the contactless measurement of the temperature by way of electromagnetic radiation, it is advantageous if the roasting/grilling plate at least partly, for example the lower side of the roasting/grilling plate, consists in the known manner of ferromagnetic material. The greatest temperature effects in the high-frequency oscillation circuit of the measurement coil result when the measurement coil is as close as possible to the roasting/grilling plate.

Accordingly the roasting/grilling device is preferably equipped with induction means, for example induction coils, and the roasting/grilling plate is inductively heated. It is also possible to heat the roasting/grilling plate with conventional heating elements. The induction means may be designed and matched to the geometry of the roasting/grilling plate in a manner such that an essentially homogeneous induction field is produced in the whole region of the roasting/grilling plate and by way of this the whole roasting/grilling plate is heated in a uniform manner.

The at least one measurement coil in the above-mentioned case is arranged between roasting/grilling plate and induction coil, as close as possible to the roasting/grilling plate. The measurement coil should encompass the complete heatable region of the roasting/grilling plate in order thus to permit an integrating temperature measurement. For the protection of the measurement coil or a whole measurement device, this is separated from the roasting/grilling plate preferably by way of insulation.

If the roasting/grilling plate is designed as a multi-layer plate, then for example only one layer of inductively heatable material may be manufactured therein. In such a case it is not the temperature of the complete roasting/grilling plate which is determined, but for example the temperature of an upper layer of the roasting/grilling plate serving as a roasting/grilling surface may be monitored.

The materials used in the roasting/grilling plates are optimised with regard to their application and are matched to one another. By way of this a very rapid heat-up time of the roasting/grilling plate, a quick and uniform heat distribution, where desired heat storage, as well as an optimal roasting/grilling surface is achieved or created. For example materials for the roasting/grilling plate are particularly heat-conducting and may be easily inductively heated, e.g. multi-layer plates. Roasting/grilling plates preferably have a surface nature which lessens the burning of the food to be roasted/grilled or simplifies the cleaning of the roasting/grilling plate.

Various methods are known for treating steel surfaces, which are applied for achieving desired properties of the surface. Desired properties of roasting/grilling plates are typically hardness, but also the stainless (rust-free) design or special adhesion properties of the surface. In a preferred embodiment of the invention, for this the roasting/grilling plate or its surface is treated with a method with methods steps for treating metal, in particular steel surfaces, said methods being known per se. This method as well as the individual method steps are a matched combination of mechanical, chemical and electrochemical (galvanic) surface treatments of steels, such as steel, chromium steel or stainless steel. In a first method step a steel surface is mechanically, chemically and/or electrochemically structured. In a second step the surface is coated or enriched with elements and materials, and in a third method step the surface is compacted. Known method steps may yet supplement the individual method steps. A coating or enriching with phosphor and chromium and a subsequent compacting for example has a positive effect on the hardness of steel, its surface structure and thus on its corrosion and adhesion properties. The treatment methods for steels and other suitable metals are hereinafter called HPCR-Inox (high-phosphor-chromium method). Steel surfaces, in particular stainless steel surfaces treated according to the HPCR-Inox method are surprisingly very particularly suitable for roasting/grilling surfaces. Roasting/grilling surfaces and roasting/grilling plates generally need to be heat-resistant, in particular with regard to the deformation and corrosion at temperatures of a few 100° C. An HPCR-Inox treated surface is characterised by its surface structure, and in particular, as the name already implies, by a high content of phosphor and chromium. By way of finely matching the method to the material to be treated one furthermore achieves astonishing temperature radiation characteristics. This leads to advantageous, very low radiation temperatures, especially in temperature ranges common in roasting/grilling device, e.g. in ranges of 100–300° C.

Apart from the thermostatic regulation of the roasting/grilling power and the heating of the roasting/grilling plate which is as uniform as possible, preferably the temperature of essentially the whole roasting/grilling plate is also detected. This may be achieved by an optimised design and arrangement of induction means and measurement coil(s).

With a suitable arrangement of induction coil and measurement coil, any influence of the induction coil on the measurement coil, i.e. on the temperature measurement is compensated. For this two measurement coils forming a measurement coil unit may be arranged next to one another in an opposing manner in the induction field. Each of the two measurement coils at the same time covers essentially half of the roasting/grilling plate. With a round roasting/grilling plate therefore the measurement coil unit should consist of two semicircular measurement coils, with a rectangular roasting/grilling plate, of two rectangles which are half the size.

Depending on the material of the induction coil, one may provide a compensation circuit in the roasting/grilling device according to the invention, which compensates the disturbing influence of changes of the electrical resistance of the induction coil and the measurement coil(s) occurring with changes of temperature on the measurement result of the measurement coils or measurement coil unit.

An induction coil itself may serve as a measurement coil. In this case a temperature measurement is preferably carried out when the induction power is briefly switched off. In order to keep the frequency of the switching procedures as low as possible, with this, the temperature measurement may be carried out in time intervals which are larger, the smaller is the difference between two successive temperature measurements. With today's electronic means it is not a problem at all to program such regulation algorithms and to let them take their course in an automatic manner.

Typically in the roasting/grilling device according to the invention, the temperature dependency of one or more physical and where appropriate also chemical variables of the material of the roasting/grilling plate is used to change the characteristic of a high-frequency oscillation circuit, e.g. the damping, wherein this change is a measure of the temperature of the roasting/grilling plate. The measurement level of a certain temperature depends on the characteristics of the high-frequency oscillation circuit, on the geometry between the roasting/grilling plate and measurement coil and on the material properties of the roasting/grilling plate. Here considerable tolerances may occur. For this reason, a measurement coil is preferably arranged centrically with respect to a middle axis of the roasting/grilling plate or with several heatable regions, centrically with respect to a middle axis of a heatable region. Moreover the roasting/grilling device according to the invention preferably contains a calibration device with which the measurement level of various temperatures of a roasting/grilling device, such as for example a room temperature or boiling point of water may be determined and stored. The roasting/grilling device according to the invention offers the advantage that the calibration is carried out on manufacture so that no subsequent calibration is required on the part of the user.

The roasting/grilling device according to the invention thus offers properties with regard to energy technology and in particular roasting/grilling technology which have not been known until now, thanks to the combination of a sensitive, quickly reacting, integrating and locally differentiated temperature evaluation and thus of a regulation of the supply of energy into the heating elements or induction means which this entails. These features may be additionally supplemented by heating elements or induction means which are optimised with regard to the roasting/grilling plate, and by way of a suitable material selection, at least of the roasting/grilling plate.

The roasting/grilling device according to the invention is preferably formed as a table-top device. At the same time all elements necessary for operating the roasting/grilling device are accommodated in a housing. The roasting/grilling device may however also be designed as an installation variant, e.g. for kitchen fitters. An installation variant for example permits the insertion of parts of the roasting/grilling device in a recess provided for this, in a cooking combination, and a subsequent adaptation or fitting of a roasting/grilling plate and any other further elements. An installation variant comprises suitable fastening means and/or connections. An energy supply at the same time is preferably designed as an integrated or separate module.

Depending on the size of the roasting/grilling device and in order simultaneously to be able to prepare various meals having a different temperature requirement, the roasting/grilling plate which for example is elongate may comprise severally individually heatable regions whose temperatures may also be measured and set individually. These regions at the same time are preferably separated from one another with regard to mutual temperature transfers by way of suitable means. Preferably exactly one induction coil is present per heatable region and this induction coil is controlled and monitored by exactly one regulation and control unit allocated to the induction coil.

The invention is hereinafter described by way of exemplary, schematically represented figures.

There are shown in

Figure 1:
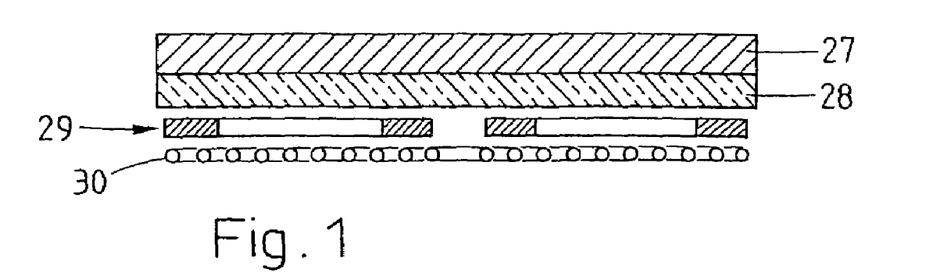
FIG. 1 a cross section through a construction of a heating and measurement region of a roasting/grilling device according to the invention, FIG. 2 a roasting/grilling device according to the invention as an individual table-top device, FIG. 3 a roasting/grilling device according to the invention as a double table-top device, FIG. 4 one embodiment of the roasting/grilling device according to the invention as an installation variant, FIG. 5 a further embodiment of the roasting/grilling device according to the invention, FIG. 6 an embodiment of an induction coil.

A preferred construction of the measurement and heating region of the roasting/grilling device according to the invention is shown in FIG. 1. An insulation layer 28, a measurement coil unit 29 consisting of two measurement coils and an induction coil 30 are located below the inductively heatable roasting/grilling plate 27. The roasting/grilling plate 27 is typically a plate containing ferromagnetic material, e.g. a plate of treated stainless steel, chromium steel or chromium plates or a multi-layer plate with at least one ferromagnetic or inductively heatable layer. The surface of the roasting/grilling plate 27 is preferably designed in a manner such that food to be roasted/grilled sticks thereto as little as possible and/or the roasting/grilling plate is simple to clean, in particular is also scratch-resistant. The plate surface furthermore has a radiation temperature which is as low as possible so that a comfortable operating climate is created. Values for a radiation temperature lie below 70° C., typically at 40–60° C., e.g. 45° C. at 2 cm above the plate with a plate temperature of 200° C. The radiation temperature here is that (air) temperature which for example is measured above the surface for example by way of conventional thermometer with surrounding conditions, e.g. of 25° C. and approx. 60% air humidity. In comparison to the specified low radiation temperatures, with comparable plate temperature and distance values of known electric roasting/grilling device, with regard to this the radiation temperature is approx. 90° or larger. No tiring heat waves at the workplace arise with low radiation temperatures, and an expensive ventilation technology is not required, which in turn leads to an increased economics of the device. The listed properties of the roasting/grilling plate surface may be achieved by a special treatment of the plate surface, e.g. by way of micro-polishing or by way of a suitable coating of the plate, e.g. anti-stick coating. The treatment of the surface of the roasting/grilling plate or of an uppermost layer of a multi-layer plate, said layer serving as a roasting/grilling surface, according to a method indicated here an HPCR-Inox method has been proven to be favourable. The HPCR-Inox method is a finely matched combination of mechanical, chemical and electrolytic treatments of the steel surface, which individual treatments are known per se. This method results in several, at least two successive thin layers, also called sandwich layer in the technical language, on the surface of the stainless steel. Thin layers are generally layers in a region of typically a few nanometres to a few micrometers, e.g. 20 nm–400 μm or 50 nm–250 μm. The two or more thin layers in total and in contrast to untreated stainless steel have a high chromium and high phosphor constituent. The fine matching of the HPCR-Inox method for treating stainless steel for roasting/grilling plates results in a phosphor constituent of approx. 10–16%, typically of 12–15%, e.g. 14% or 15% in the sandwich layer. The layer which is deposited last in the coating method is a pure chromium layer. Due to the heating of the roasting/grilling plate, part of the chromium diffuses into the steel or into the lower layers, or nickel from the lower layers mixes with the chromium so that the sandwich layer has a chromium constituent in a region of 10–40%, typically in a region of 15–30%, e.g. 20%. A cover layer, i.e. the uppermost and that thin layer which essentially serves as the roasting/grilling surface thus comprises an exemplary chromium content of approx. 20%–100%, e.g. 30%–80%.

The HPCR-Inox method includes essentially three method steps which may be described as a) structuring, b) coating and c) compacting of the steel surface. The individual method steps are carried out with methods which are known per se. The structuring is effected for example by way of a combination of mechanical, chemical and electrochemical measures such as grinding, brushing and blasting (sand or ball blasting), galvanic baths etc. With this, an initially roughened coarsely structured surface is refined. Subsequently the previously structured surface is treated with a high phosphor content nickel and provided with a chromium closure, the cover layer. In a simple variant of the method this second method step, the coating b) includes only two sub-steps: an enrichment with phosphor and an enrichment with chromium. This leads essentially to a high phosphor content and nickel-containing layer on the steel surface, and a chromium cover layer is deposited on this phosphor-containing layer. In a last method step the surface is compacted, which again is accomplished typically in a mechanical manner. The individual method steps may also be repeated, replaced with known method steps or supplemented or suitably adapted, depending on which property the treated surface is to have.

The insulation layer 28 of the multi-layer plate e.g. a highly-insulating ceramic fibre layer insulates the measurement coils and the induction coil and any occurring regulation and control units located in the vicinity from the hot roasting/grilling plate 27. The insulation layer may also have yet further properties, e.g. a moisture insulation. The induction coil 30 is for example a copper coil. It is preferably formed in two-dimensional manner as a spiral in a rectangular shape so that essentially the complete surface of the rectangular roasting/grilling plate 27 is uniformly heated and may be used as a roasting/grilling surface (with a round roasting/grilling plate the induction coil is to be designed in a corresponding two-dimensional and round manner). In particular, with this one may uniformly roast/grill food to be roasted/grilled independently of its position on the roasting/grilling surface. Two measurement coils of the measurement device which are of the same type lie next to one another and in each case encompass roughly half the surface covered by the induction coil. The measurement coils are preferably connected to one another in an opposing manner such that the voltages induced in them by the induction coil mutually cancel one another.

Figure 2:
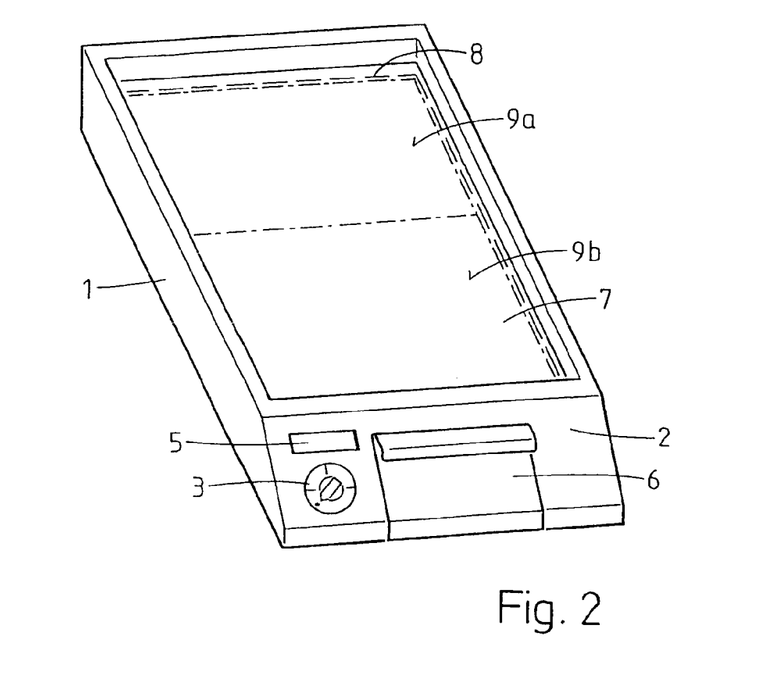

A roasting/grilling device according to the invention is shown in FIG. 2 as an individual table-top device. The roasting/grilling plate 7 comprises a roasting/grilling surface 8 which is drawn in dashed and is covered by the induction coil located below the roasting/grilling surface. The measurement surfaces 9a, 9b which are covered by the measurement coil unit likewise arranged below the roasting/grilling plate 7 are drawn in a dot-dash manner. The induction coil has an essentially rectangular shape so that it is capable of covering roughly the whole roasting/grilling plate 7 with an induction field in a manner such that a maximal roasting/grilling surface arises. The windings of the induction coil at the same time, are arranged in turn such that a homogeneous induction field is produced over the whole surface of the roasting/grilling plate. The measurement surfaces 9a, 9b cover essentially the same area as the induction coil and may preferably be monitored separately. This permits a temperature measurement of the roasting/grilling plate covering the whole surface. In order to prevent disturbance signals of the induction coils when measuring the temperature, a supply of energy into the induction coil may be interrupted for a brief period in order to be able to carry out the temperature measurement independently.

The housing 1 on its front side 2 comprises a switch means, e.g. a rotary switch 3 for selecting various nominal temperatures in the region of room temperature to 250° C. or 300° C., e.g. in 10–20° C. or preferably smaller, e.g. 2° C. steps. The nominal temperatures are the temperatures which are reached on the roasting/grilling surface 8, i.e. with which the food to be roasted/grilled is indeed roasted/grilled. The rotary switch 3 is accordingly connected to a regulation and control unit, e.g. a computer chip or microprocessor which is connected to the measurement coil unit and to an energy supply (not shown), e.g. generator, for the induction means, which is likewise located in the table-top device. The measurement coil unit or the measurement device and regulation and control unit may also be designed as one unit. The front side 2 comprises further display means 5 for displaying the current roasting/grilling temperature. This is preferably a digital display which is capable of displaying the roasting/grilling temperatures in a particularly accurate manner and displays this accurately to 5° C. The display means 5 may also be designed such that it yet displays further details, e.g. the nominal temperature or the current heating power. Furthermore a collection tray (trough) 6 is incorporated in the front side 2, into which juice or other roasting/grilling residues are removed from the roasting/grilling surface 4 and disposed off. The collection tray 6 may be designed such that it extends essentially over the complete height and width of the device, but also over only a part of the width or height.

For this the roasting/grilling plate 5 comprises an opening (not shown in the figure), e.g. a circle, a semicircle or a slot through which the juice may flow away, or roasting/grilling residues may be pushed, and then collected in the collection tray 6. An opening between the roasting/grilling plate and the edge of the roasting/grilling device may also be simply present in the roasting/grilling device. In order to prevent material stress in the roasting/grilling plate or in the transition of the roasting/grilling plate and enclosure of the roasting/grilling plate, also with a heat lasting for some time, the roasting/grilling plate is preferably formed in a deep-draw design. The roasting/grilling device may additionally be provided with a spray guard, which may preferably be stuck on.

The supply of energy into the induction coil is preferably regulated in a manner such that it sets in as soon as the set nominal temperature lies above the measured actual temperature, and that it is cut off as soon as the actual temperature lies above the nominal temperature so that a delay-free, electronic regulation of the temperature in real time arises. At the same time in each case the full power may be switched. It is however also possible to effect a metered supply of energy. For example the roasting/grilling device on reaching the nominal temperature may transfer into a stand-by mode. At the same time for example only temporarily, or a small power is supplied to the induction means. Even the smallest of temperature fluctuations of below 1° C., e.g. 0.5° C. may be determined in the roasting/grilling device according to the invention. The reaction times to such temperature fluctuations are typically extremely short, e.g. in the range of microseconds. By way of this the energy consumption of the roasting/grilling device remains minimal, since in particular no large temperature losses arise which need to be compensated. With this one may prepare the food to be roasted/grilled with maximal 2% deviation from the desired temperature. By way of an optimised matching in the roasting/grilling device, in particular in the roasting/grilling plate, of the materials used, the temperature regulation and of the supply of energy, one may achieve an extremely rapid heat-up time of the roasting/grilling plate. In an exemplary range of 20–200° C. this is about 4–5 minutes.

The frequency of temperature measurement may essentially be selected freely. A temperature measurement is for example carried out several times per minute. It is likewise also possible, with a sufficient shielding of the measurement device and any occurring additional corrections of the readings, to carry out a measurement of the roasting/grilling plate 7 and its heating simultaneously.

The roasting/grilling device preferably has a ventilation, e.g. a fan, wherein the housing 1 for example is provided with ventilations slots.

The size of the rectangular induction coil for a single table-top device preferably lies in a range of 850–2000 cm$^2$, typically in a range of 1000–1500 cm$^2$, e.g. 1300 cm$^2$. This corresponds roughly to a rectangular coil with the preferred dimensions of 290×430 mm. Preferably in each case two measurement coils of e.g. 145×430 mm are allocated to this rectangular coil so that together they yield the same areas (surface) as that of the induction coil.

The insulation layer may also be an air gap depending on the material of the measurement device and of the induction coil and possibly also of a regulation and control unit.

Figure 3:
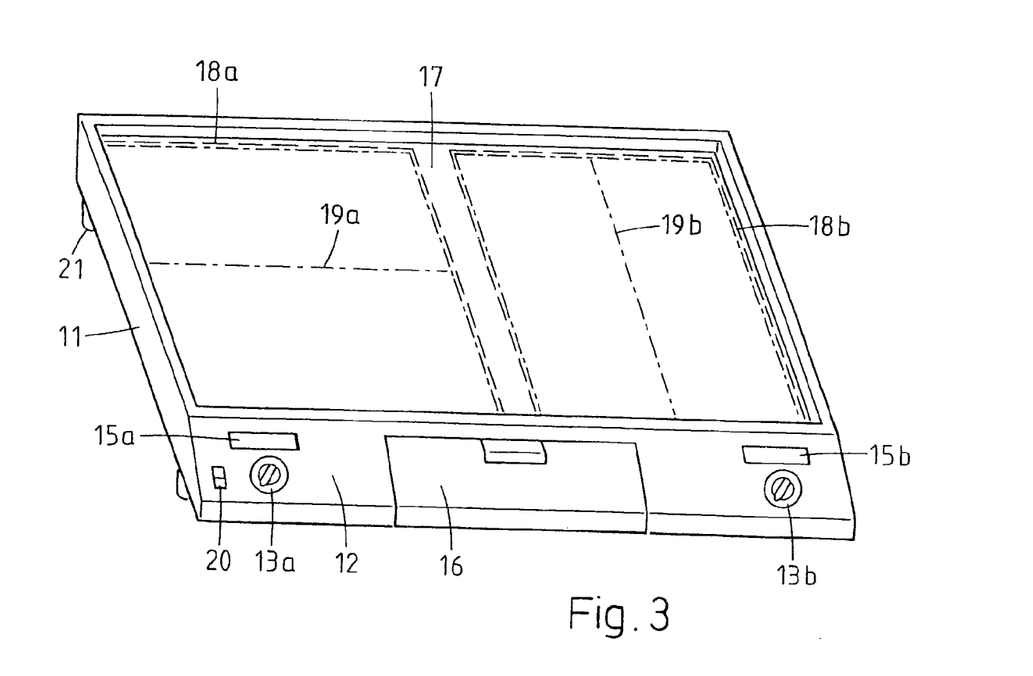

FIG. 3 shows a preferred embodiment of the roasting/grilling device as a double-induction table-top device. The double device has a continuous roasting/grilling plate 17 with two regions 18a, 18b which are drawn dashed, which lie next to one another, in each case are roughly square, may be heated individually and whose temperatures may be individually measured and set. The dot-dash lines indicate the measurement coil units 19a, 19b, consisting of in each case two rectangular measurement coils, wherein the measurement coil unit is allocated to each induction coil.

The roasting/grilling device, in particular the roasting/grilling plate is designed such that a temperature transfer from a region 18a into the adjacent region 18b is prevented or at least is greatly suppressed. This is effected preferably by way of incorporating a wedge into or in the inside of a roasting/grilling plate. Such a wedge may run over the whole length or width of a roasting/grilling plate and with a multi-layer plate is typically incorporated in an inner layer. One exemplary construction of a multi-layer plate is an aluminium layer which is incorporated between two stainless steel layers. The thickness of the stainless steel layers lie in a region of 0.4–1.5 mm, e.g. 0.7 mm, those of the aluminium layer in a region of 4–15 mm, e.g. 7 mm. The aluminium layer essentially assumes the storage and distribution of heat, whilst in the stainless steel layers or at least one of them, heat is produced in an inductive manner. In order to render any occurring non-magnetic materials magnetic, such as stainless steel for example, this is suitably treated, for example pressed, before use in a roasting/grilling plate. The layer which serves as a roasting/grilling surface is furthermore surface-treated so that it is resistant as possible to heat, corrosion and scratches. With the treatment of the surface according to the HPCR-Inox method it is furthermore possible to design this in a fat-repellent and fluid-repellent manner as well as in a poorly reflecting manner.

First and second switch means 13a, 13b, first and second display means 15a, 15b, for setting and displaying the roasting/grilling temperatures, as well as a further switch or display means 20, e.g. for switching on the device or for displaying whether the device is connected to an external energy source, are located on the housing 11. The first and second switch means 13a, 13b are connected to two regulation and control units which are located in the housing and which in turn are connected to two energy supplies for the two essentially square induction coils, said energy supplies likewise being located in the housing. The two regulation and control units regulate the energy supply of the two induction coils whilst taking into account the settings of the switch means 13a, 13b and the readings of the measurement coils or measurement units. Two measurement coils forming a measurement unit are allocated to each induction coil, wherein a measurement unit covers essentially the same surface 18a or 18b of the roasting/grilling plate 17 as an induction coil.

A collection tray 16 which is as easily accessible as possible is incorporated in the front side 12. Height-adjustable and lockable feet 21 with which the roasting/grilling device may be positioned on a surface in a preferably anti-slip manner are located on the lower side of the device.

Figure 4:
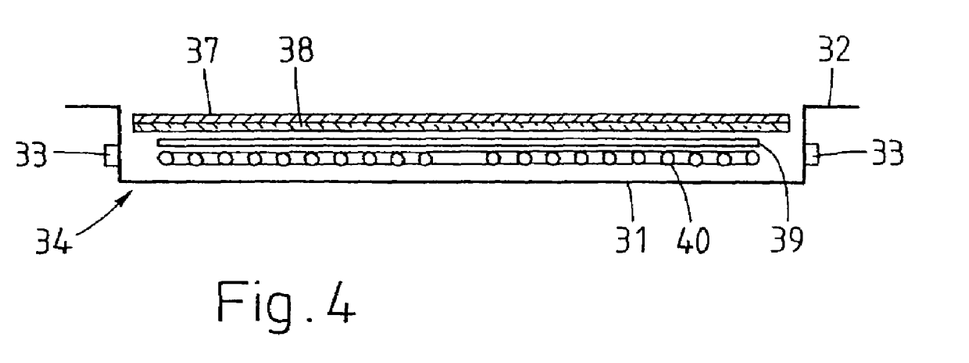

One embodiment of a roasting/grilling device as an installation variant is shown in FIG. 4. It contains essentially a housing 31 with induction means 40 and a measurement device 39, as well as associated regulation and control means or connections thereto (not shown in the figure). The installation variant is designed such that it is installed into a kitchen combination and here in the case that this has not already been previously provided, is combined with a roasting/grilling plate 37 and with an insulation layer 38 and may be connected to an energy supply, e.g. a generator. The housing 31 for this comprises holding means 32, e.g. projections, passages for screws etc., as well as connections 33 for the energy supply. The energy supply for example is an external generator module which may be accommodated in the same kitchen combination. Furthermore the housing contains further connections 34 for any occurring switch and display means.

Figure 5:
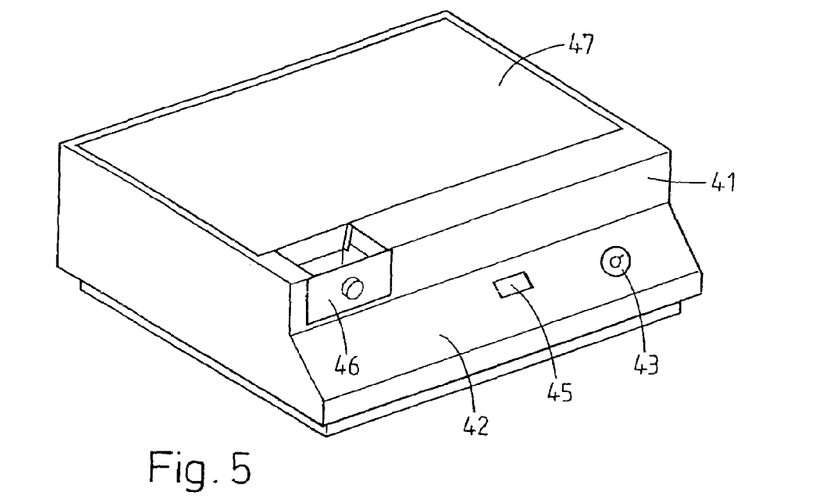

FIG. 5 shows an individual roasting/grilling device according to the invention with a roasting/grilling plate 47 and a collection tray 46 which together with the upper part of the housing are attached essentially in a plane or are arranged amongst one another in a flush manner. Thus no openings in, or gaps next to the roasting/grilling plate 47 are required in order to be able to dispose of waste. The front side 42 comprises display means 45 and switch means 43 for displaying or setting the desired roasting/grilling and actual temperature respectively. The roasting/grilling device by way of an externally, simple, plain and compact construction is very appealing. It also permits a very simple cleaning since no difficultly accessible housing corners and edges are present. The switch means may furthermore be designed as a so-called "touch screen" and for example be integrated into the display means 45. A double roasting/grilling device according to this embodiment is distinguished typically in the depth or width of the device, wherein the same display or switch means may be used when suitably adapted.

Figure 6:
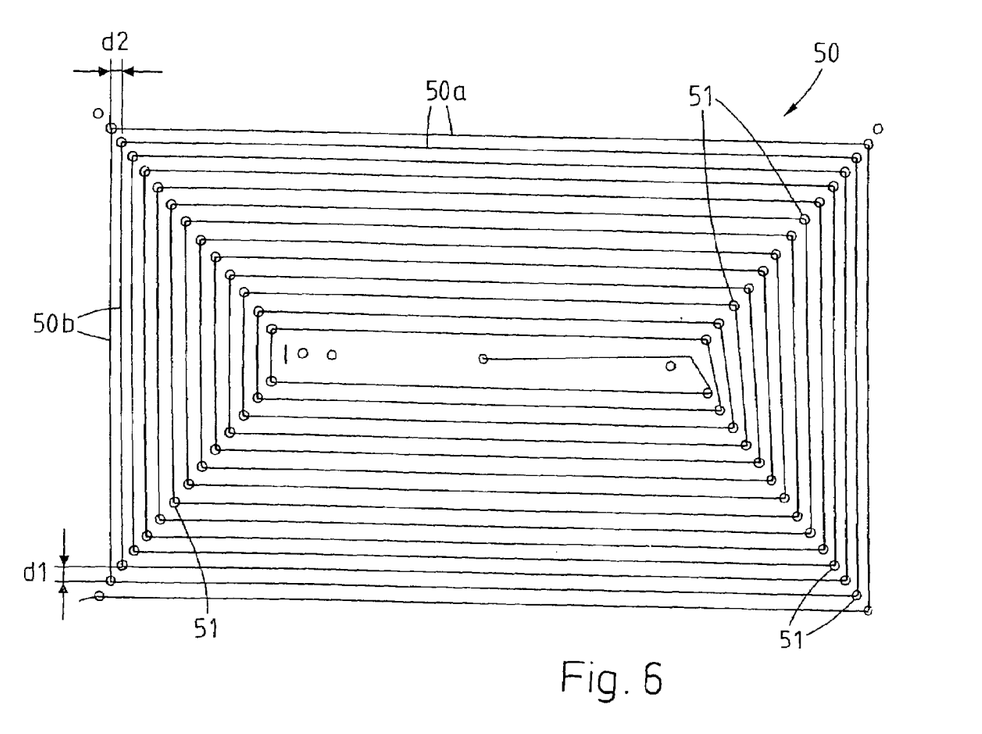

An induction coil 50 which in the condition in which current flows through it produces a homogeneous magnetic field and produces a homogeneous induction field essentially over the whole extension of a rectangular roasting/grilling surface arranged adjacent to the induction coil (with the exception of insulating, non-magnetic layer) is shown in FIG. 6. The homogeneity of the magnetic field is achieved by way the special winding of the induction coil, e.g. of the copper wire or cord. At the same time the distances d1 between two winding sections on the longitudinal side 50a of the coil and the distances d2 between two winding sections on the width side 50b of the coil are at a certain ratio to one another. These distances d1, d2 are variable and are in particular different at the outer and inner windings of the coil, i.e. d1 and d2 vary as a function of the winding diameter. With the exception of a few innermost winding points with the winding points 51 which are arranged with an inwardly increasing distance on the diagonals of the coil, for a homogeneous coil magnetic field there results a ratio d1/d2 which may be computed directly from magnetic field computations for coils with details of length, width and the number of windings of a coil. Exemplary values are a coil size of 395 mm×225 mm with 28 windings.

The invention claimed is:

1. A thermostatically regulated roasting/grilling device with a roasting/grilling plate incorporated in the roasting/grilling device for directly placing food onto said plate, comprising at least one measurement coil forming an element of a high-frequency oscillation circuit, wherein with the at least one measurement coil the temperature of the roasting/grilling plate may be monitored in a contactless manner by way of electromagnetic radiation and the temperature may be used for the thermostatic regulation of the roasting/grilling power.

2. A roasting/grilling device according to claim 1, wherein the roasting/grilling plate contains a ferromagnetic material and wherein at least one induction coil is present for heating the roasting/grilling plate.

3. A roasting/grilling device according to claim 2, wherein the induction coil is designed with a rectangular shape and the size of this induction coil corresponds essentially to the extension of the roasting/grilling plate.

4. A roasting/grilling device according to claim 3, wherein the distances d1 between two winding sections on longitudinal sides of the rectangular coil and distances d2 between two winding sections on width sides of the rectangular coil are different and vary as a function of the winding diameter.

5. A roasting/grilling device according to claim 2, wherein the windings of the induction coil are arranged in a manner such that an essentially homogeneous magnetic field may be produced essentially on the complete extension of the roasting/grilling plate.

6. A roasting/grilling device according to claim 3, wherein the windings of the induction coil are arranged in a manner such that an essentially homogeneous magnetic field may be produced essentially on the complete extension of the roasting/grilling plate.

7. A roasting/grilling device according to claim 2, wherein at least one measurement coil is arranged between the roasting/grilling plate and the induction coil.

8. A roasting/grilling device according to claim 3, wherein at least one measurement coil is arranged between the roasting/grilling plate and the induction coil.

9. A roasting/grilling device according to claim 7, wherein the at least one measurement coil is arranged in a manner such that it covers essentially the same region of the roasting/grilling plate as the induction coil.

10. A roasting/grilling device according to claim 8, wherein the at least one measurement coil is arranged in a manner such that it covers essentially the same region of the roasting/grilling plate as the induction coil.

11. A roasting/grilling device according to claim 7, comprising two measurement coils forming a measurement coil unit, which measurement coils are arranged next to one another in an opposing manner in the induction field of the induction coils.

12. A roasting/grilling device according to claim 8, comprising two measurement coils forming a measurement coil unit, which measurement coils are arranged next to one another in an opposing manner in the induction field of the induction coils.

13. A roasting/grilling device according to claim 9, comprising two measurement coils forming a measurement coil unit, which measurement coils are arranged next to one another in an opposing manner in the induction field of the induction coils.

14. A roasting/grilling device according to claim 10, comprising two measurement coils forming a measurement coil unit, which measurement coils are arranged next to one another in an opposing manner in the induction field of the induction coils.

15. A roasting/grilling device according to claim 7, comprising a compensation circuit, which compensates disturbing influences of changes of the electrical resistance of the induction coil and of the at least one measurement coil occurring with changes of temperature, on the measurement result of the measurement coil or measurement coil unit.

16. A roasting/grilling device according to claim 8, comprising a compensation circuit, which compensates disturbing influences of changes of the electrical resistance of the induction coil and of the at least one measurement coil occurring with changes of temperature, on the measurement result of the measurement coil or measurement coil unit.

17. A roasting/grilling device according to claim 9, comprising a compensation circuit, which compensates disturbing influences of changes of the electrical resistance of the induction coil and of the at least one measurement coil occurring with changes of temperature, on the measurement result of the measurement coil or measurement coil unit.

18. A roasting/grilling device according to claim 10, comprising a compensation circuit, which compensates disturbing influences of changes of the electrical resistance of the induction coil and of the at least one measurement coil occurring with changes of temperature, on the measurement result of the measurement coil or measurement coil unit.

19. A roasting/grilling device according to claim 2, wherein the induction coil is also a measurement coil, and that a temperature measurement takes place when the induction power is switched off.

20. A roasting/grilling device according to claim 1, comprising a regulation and control unit which measures the temperature of the roasting/grilling plate in time intervals which are larger, the smaller is a temperature difference between two successive temperature measurements.

21. A roasting/grilling device according to claim 2, wherein exactly one regulation and control unit is allocated to each induction coil.

22. A roasting/grilling device according to claim 1, comprising a calibration device with which measurement levels of various temperatures of the roasting/grilling plate may be determined and stored.

23. A roasting/grilling device according to claim 1, wherein the roasting/grilling plate comprises several regions which may be individually heated and whose temperature may be determined and set in an individual manner.

24. A roasting/grilling device according to claim 23, wherein in the roasting/grilling plate there are provided means which prevent a temperature transfer between the individual regions.

25. A roasting/grilling device according to claim 24, wherein the roasting/grilling plate is a multi-layer plate which contains a layer of aluminium between two layers of stainless steel and that a wedge is incorporated in the aluminium layer.

26. A roasting/grilling device according to claim 1, comprising a heat-resistant and corrosion-resistant roasting/grilling plate surface which in the heated condition and with roasting/grilling plate temperatures in the application range has low radiation temperatures in a manner such that with a roasting/grilling plate temperature of 200° C., temperatures of smaller than 70° C. are measured close to the roasting/grilling surface.

27. A roasting/grilling device according to claim 26, wherein the roasting/grilling plate in the region of the roasting/grilling plate surface comprises at least two successive thin layers, wherein the at least two thin layers in total contain 10–15% phosphor.

28. A roasting/grilling device according to claim 27, wherein the at least two thin layers have a phosphor constituent of 12–15% and a chromium constituent of 15–30%.

29. A thermostatically regulated roasting/grilling device with a roasting/grilling plate incorporated in the roasting/grilling device for directly placing food onto said plate, comprising at least one measurement coil unit forming an element of a high-frequency oscillation circuit, with said at least one measurement coil unit the temperature of the roasting/grilling plate may be monitored in a contactless manner by way of electromagnetic radiation and the temperature may be used for the thermostatic regulation of the roasting/grilling power, wherein the roasting/grilling plate contains a ferromagnetic material, the roasting/grilling device further comprising:

at least one induction coil for heating the roasting/grilling plate, wherein the size of said induction coil corresponds essentially to the extension of said roasting/grilling plate, and wherein the at least one measurement coil unit is arranged between the roasting/grilling plate and the induction coil in a manner such that it covers essentially the same region of the roasting/grilling plate as the induction coil, and wherein two measurement coils form said measurement coil unit, which two measurement coils are arranged next to one another in an opposing manner in the induction field of the induction coil.

30. A thermostatically regulated roasting/grilling device with a roasting/grilling plate incorporated in the roasting/grilling device for directly placing food onto said plate, wherein at least one measurement coil forms an element of a high-frequency oscillation circuit, and wherein with said at least one measurement coil the temperature of the roasting/grilling plate may be monitored in a contactless manner by way of electromagnetic radiation and the temperature may be used for the thermostatic regulation of the roasting/grilling power, and wherein at least one induction coil is present for heating the roasting/grilling plate, the induction coil being designed with a rectangular shape and in a manner such that the distances d1 between two winding sections on longitudinal sides of the rectangular coil and distances d2 between two winding sections on width sides of the rectangular coil are different and vary as a function of the winding diameter, whereby an essentially homogeneous magnetic field may be produced essentially on the complete extension of the roasting/grilling plate.

31. A thermostatically regulated roasting/grilling device with a roasting/grilling plate incorporated in the roasting/grilling device for directly placing food onto said plate, comprising at least one measurement coil forming an element of a high-frequency oscillation circuit, wherein with said at least one measurement coil the temperature of the roasting/grilling plate may be monitored in a contactless manner by way of electromagnetic radiation and the temperature may be used for the thermostatic regulation of the roasting/grilling power, further comprising at least one induction coil for heating the roasting/grilling plate and comprising a regulation and control unit which measures the temperature of the roasting/grilling plate in time intervals which are larger, the smaller is a temperature difference between two successive temperature measurements, wherein exactly one regulation and control unit is allocated to each induction coil, the roasting/grilling device further comprising a calibration device with which measurement levels of various temperatures of the roasting/grilling plate may be determined and stored, wherein the roasting/grilling plate comprises several regions which may be individually heated and whose temperature may be determined and set in an individual manner, and wherein a temperature transfer between the individual regions is prevented by corresponding means provided in the roasting/grilling plate.

32. A thermostatically regulated roasting/grilling device with a roasting/grilling plate incorporated in the roasting/grilling device for directly placing food thereon, comprising at least one measurement coil forming an element of a high-frequency oscillation circuit, wherein with the at least one measurement coil the temperature of the roasting/grilling plate may be monitored in a contactless manner by way of electromagnetic radiation and the temperature may be used for the thermostatic regulation of the roasting/grilling power, wherein the roasting/grilling plate is a multilayer plate which contains a layer of aluminium between two layers of stainless steel with a wedge incorporated in the aluminium layer, and wherein the roasting/grilling plate has a heat-resistant and corrosion-resistant surface, the roasting/grilling plate in the region of the roasting/grilling plate surface comprises at least two successive thin layers, which at least two thin layers in total have a phosphor constituent of 10–15% and a chromium constituent of 15–30%.

* * * * *